United States Patent

[11] 3,581,483

| [72] | Inventors | Victor P. Kohl<br>R.F.D.;<br>Marion G. Amick, R.D.1, both of<br>Middletown, Del. 19709 |
|---|---|---|
| [21] | Appl. No. | 810,456 |
| [22] | Filed | Mar. 26, 1969 |
| [45] | Patented | June 1, 1971 |

[54] ASPARAGUS HARVESTER AND METHOD OF HARVESTING ASPARAGUS
8 Claims, 10 Drawing Figs.

[52] U.S. Cl............................................... 56/327,
56/155, 56/246, 56/293
[51] Int. Cl................................................ A01d 45/00,
A01d 55/00
[50] Field of Search........................................... 56/327,
246, 247, 248, 155, 293

[56] References Cited
UNITED STATES PATENTS

| 208,355 | 9/1878 | Wright | 56/246 |
|---|---|---|---|
| 470,578 | 3/1892 | Kidd | 56/246 |
| 1,989,821 | 2/1935 | Peterson | 56/246 |
| 2,670,586 | 3/1954 | Phillips | 56/158 |
| 2,685,162 | 8/1954 | Head | 56/293 |
| 3,472,009 | 10/1969 | Porter | 56/327 |

*Primary Examiner*—Russell R. Kinsey
*Attorney*—Wilkinson, Mawhinney and Theibault ABSTRACT: The asparagus stalks are cut at suitable level or height by diamond or triangular teeth formed on a thin knife blade in which the inclined edges of the teeth are sharpened from beneath the blade only leaving a flat planar upper surface of the blade as a support for the severed stalks as the inclined teeth cut through same, the thin knife blade being affixed for support and substantial rigidity to a rigid bar which is supported only at its end portions by linkages which compel a species of horizontal oscillating movement of the bar and supported blade compounded of a transverse cutting stroke and simultaneous forward and rearward movements of the teeth by which the inclined edges of said teeth are shifted forwardly and rearwardly while being reciprocated laterally, means being provided in connection with one linkage at least to automatically supply such composite motion incident to the movement of the harvester through the field, while a blast of air directed rearward against the forward surfaces of the asparagus stalks holds the stalks to the line for efficient and clean cutting thus preserving the stalks in prime condition for command of highest prices in the commercial market, the air blast serving also to remove the severed stalks to a conveyor or other means by which the stalks are finally evacuated to a suitable destination.

INVENTORS
VICTOR P. KOHL &
MARION G. AMICK

BY Wilkinson, Mawhinney and Thiebault
ATTORNEYS

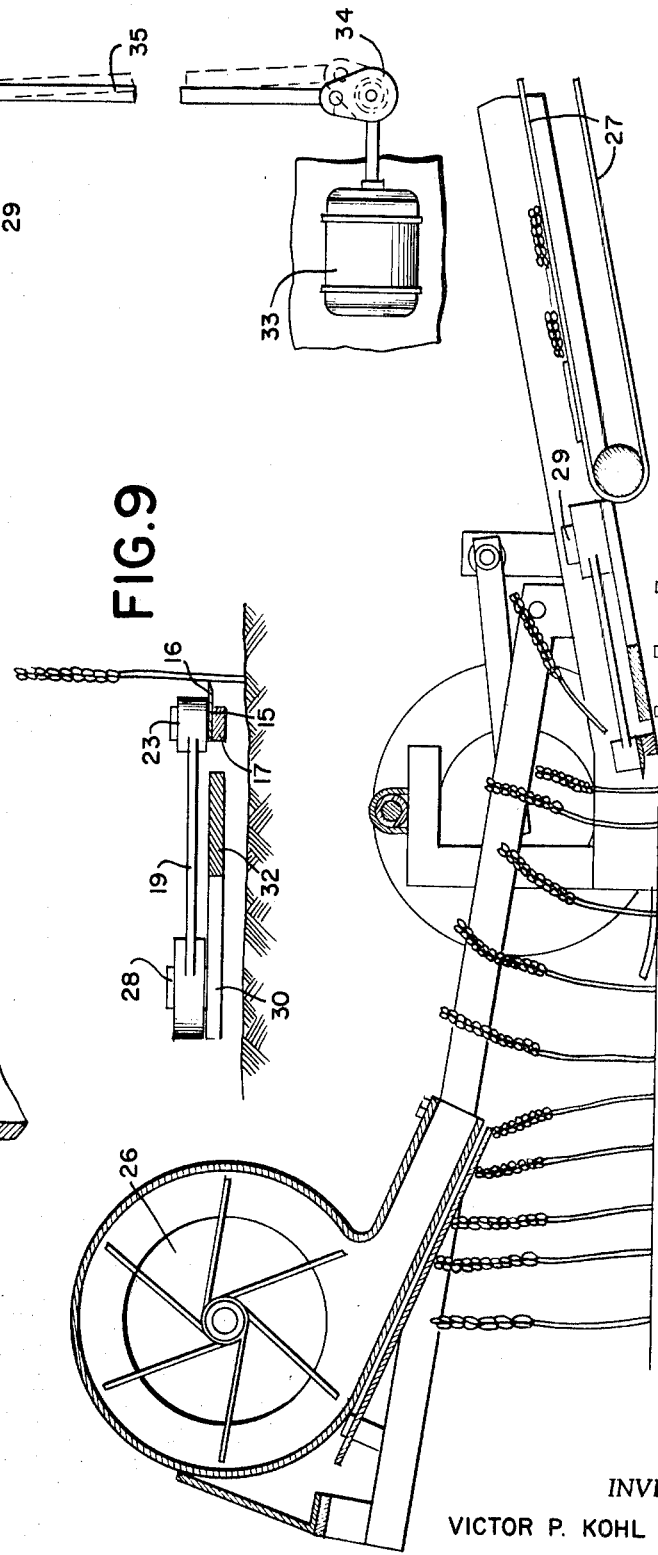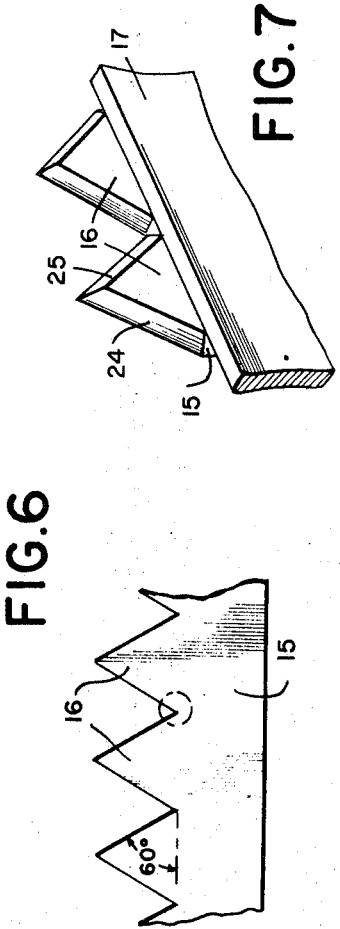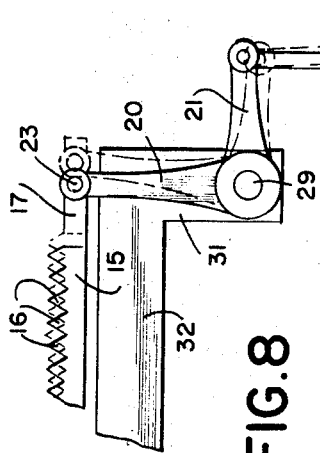

ASPARAGUS HARVESTER AND METHOD OF HARVESTING ASPARAGUS

The present invention relates to asparagus harvester and method of harvesting asparagus and constitutes certain improvements over the similarly entitled invention forming the subject matter of our prior application Ser. No. 653,765 filed July 17, 1967 and now abandoned.

In the harvesting of asparagus wherein all stalks of different heights are cut (mowed) as the machine proceeds along the rows, a reciprocating knife is used. The present knives are of a conventional type using standard triangular teeth sections mounted on a bar. Such bar and teeth are supported by a guard extending beyond the points of the knife in such manner that the stalks are supported laterally by the guard as the knife edge moves in the direction of the guard, thus shearing or cutting the stalks.

We have found that such mechanism causes serious physical damage to the cut asparagus, such as bruising of the stalks. Also, the guards inhibit the removal of the cut stalks from the cutting zone and recutting of the stalks frequently occurs. Experience has shown that products intended for quality packaging, when produced by such mechanism, result in a large percentage being unfit for use even after expenditure of excessive labor to segregate the most severely damaged. This procedure results in serious financial loss to both the grower and processor.

It thus has become apparent that a proper functioning knife must have the following attributes:
1. The conventional knife guard must be eliminated.
2. The knife must cut clean and essentially square with the axis of the stalk.
3. The blade design must be such that the solid area between cutting edges is sufficient to support the end of the cut stalk to prevent gravity from dropping the stalk between the cutting edges, thus preventing recutting or other similar damage to the stalk.

The primary object of the invention is to so reconstruct an asparagus harvester as to dispense with the guards and to improve the character of the knife blade and teeth as to harvest uniformly unbruised stalks of asparagus calculated to command the highest price in the select market.

Another object of the invention is to provide an actuating mechanism for the knife and teeth such that the knife will be oscillated back and forth crosswise of the rows of plants in which such oscillating movement involves components of lateral reciprocation and fore-and-aft motion simultaneously impressed on the knife to result in a novel shear cut while supporting the cut stalks on the upper surfaces of the knife and teeth.

With the foregoing and other objects in view, the invention will be more fully described hereinafter, and will be more particularly pointed out in the claims appended hereto.

In the drawings, wherein like symbols refer to like or corresponding parts throughout the several views:

FIG. 6 is an enlarged fragmentary top plan view of a form of knife blade and teeth with preferred dimensions added and an asparagus stalk illustrated in the act of being cut and supported by the blade.

FIG. 7 is a fragmentary perspective view taken from the under surface of the support bar showing under surfaces of the teeth beveled or sharpened only on such under surfaces.

FIG. 8 is a fragmentary top plan view of a form of mechanism for imparting oscillatory motion to the bar and knife blade.

FIG. 9 is an end view with a part of a frame member in section illustrating the attack of the knife teeth upon an asparagus stalk, and FIG. 10 is a side elevation with parts shown in section of a harvesting machine according to the invention equipped with blower and conveyor mechanisms.

Figure 1:
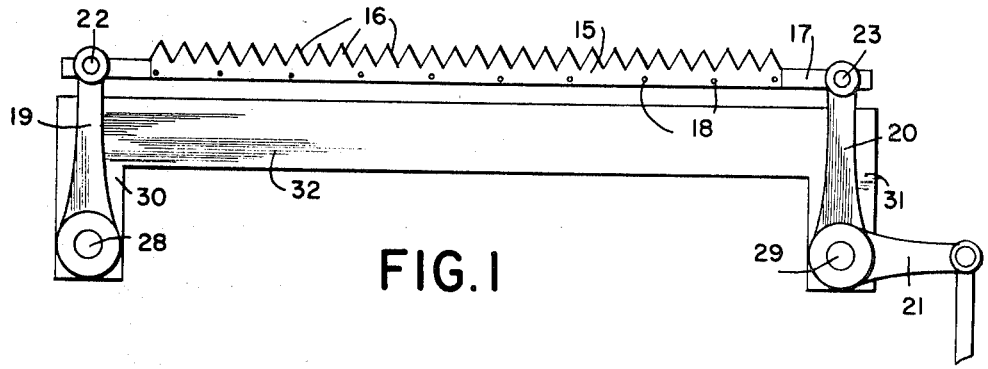
FIG. 1 is a top plan view of a preferred form of knife blade and teeth with preferred form of mounting for oscillating movement, the blade being shown in an intermediate position.
Figure 2:
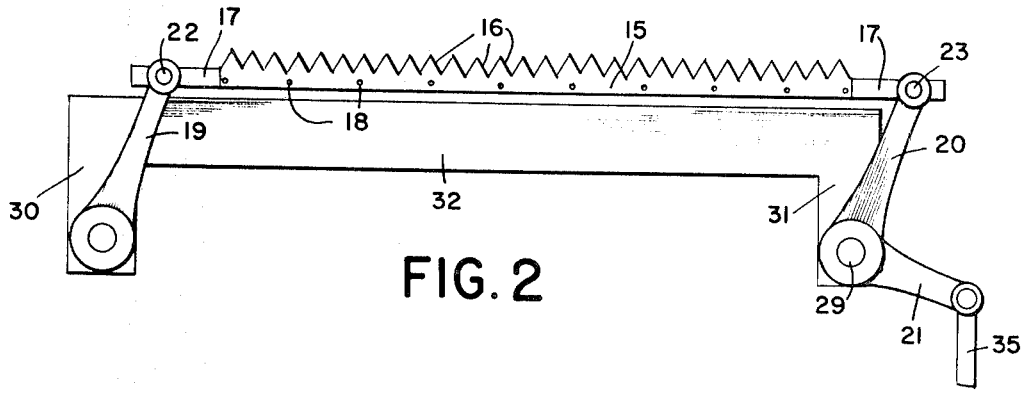
FIG. 2 is a similar view showing the blade and its mounting shifted in one direction of movement.
Figure 3:
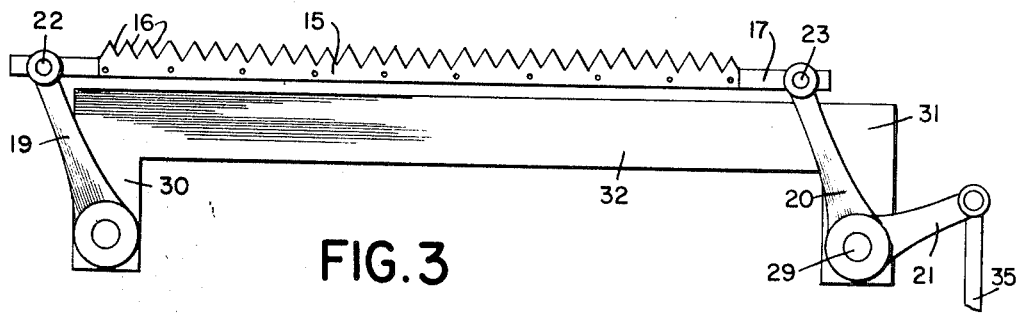
FIG. 3 is also a top plan view showing the knife blade and mounting shifted into the opposite position of its oscillation.
Figure 4:
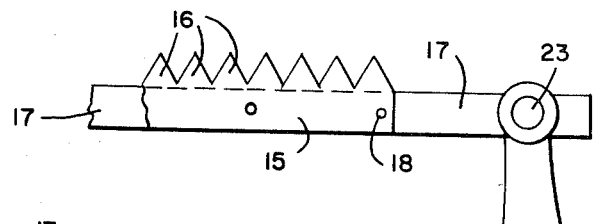
FIG. 4 is a fragmentary top plan view showing the knife blade and its teeth as made in one piece.
Figure 5:
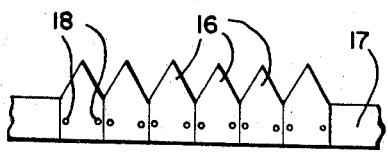
FIG. 5 is also a fragmentary top plan view of a modified form of device in which the teeth are individual and separately and individually riveted or otherwise attached to the supporting bar.

Referring more particularly to the drawings, 15 designates a preferred form of knife blade which meets all of the above requirements, which is made of relatively thin sheet steel, for example of 20 gauge thickness, with approximately 60° diamond point teeth 16 on a pitch of the order of ½ to 1½ inches.

The usual guards, which also served as guides, are eliminated and the thin knife blade 15 is directly affixed to a rigid bar 17 by rivets, brads 18 or any appropriate fastening means. The rigid bar 17 is solely supported at its end portions, which preferably extend beyond the ends of the thin flexible knife blade 15, by links 19 and 20, one of which links 20 may be a part of a bellcrank lever 21. By this arrangement no contact is made with any guide surface or supporting surface except in sealed bearings 22 and 23 at the ends of the rigid bar 17.

By beveling or sharpening the cutting edges 24 and 25 (FIG. 7) of the teeth 16 on the bottom surfaces only, the distortion of the asparagus stalk during the cutting action occurs only on the lower residual stalk section left in the ground and not on the end of the removed product.

The use of a 60° diamond tooth between the range of ½ to 1½ pitch leaves sufficient solid metal to support the end of the stalk after severance against the force of gravity until such time as an effective means of moving the stalk from the cutting zone can be applied. FIG. 6 shows generally how the oscillated blade causes the teeth to incise the stalk while the cleanly cut horizontal incision of the lower cut end of the asparagus spear rides on and is supported by the top flat surface of the knife blade and incident teeth.

We have found that the use of an air blast at high velocity (approximately 3,500 to 5,000 feet per minute) is the most effective means of supporting and moving the stalks during and after severance. The mechanism for creating such air blast is shown in FIG. 10 and generally comprises a blower 26 carried on the harvester in advance of the cutting mechanism and so mounted as to direct an air blast in a rearward direction against the forward edges of the asparagus shoots tending to bend the shoots into the severing mechanism and subsequently to drive the harvested spears onto a conveyor 27 which carries the spears rearward to an exit destination.

The rear ends of the links 19, 20 may be pivoted as at 28, 29 to rearwardly directed end bars 30 and 31 of a frame member 32 of the harvester frame.

In FIG. 8 is shown a device for oscillating the bar 17 and knife blade 15 which includes an electric motor 33, gearing 34 and an oscillating link 35 connected to the bellcrank 21. Any other mechanism for oscillating the cutting mechanism may be used.

What we claim is:
1. An asparagus harvester comprising
    a. a knife blade,
    b. a rigid bar fixedly and rigidly supporting the knife blade, and
    c. means connected only to the end portions of the bar for supporting the knife blade and bar only and for providing same with oscillating motion.

2. An asparagus harvester as claimed in claim 1 in which said knife blade is thin to the point of flexibility when apart from the bar further comprising
    d. teeth on the blade projecting forwardly of the supporting bar for encountering the asparagus stalks incident to the movement of the harvester through the field.

3. An asparagus harvester as claimed in claim 1 in which said means comprises d. linkages pivoted to said end portions of the bar and to the harvester, and e. means connected to at least one of said linkages for imparting the oscillating motion to the bar and entrained knife blade.

4. An asparagus harvester as claimed in claim 2 in which said teeth are substantially triangular with apex points forwardly in the direction of movement of the harvester and inclined edges diverging rearwardly from the apex points and sharpened only on under sides thereof, with the knife edges lying in substantially the plane of the upper faces of the teeth to cause the lower faces of the upper severed segments of the asparagus stalks to ride on such upper faces of the teeth as an incident of the cutting operation.

5. An asparagus harvester as claimed in claim 4 further comprising e. means for generating a blast of air in a zone forwardly of the knife blade and directed rearwardly of the harvester against the asparagus stalks in an orientation to cause the stalks to resist any tendency to move or bend forwardly generated by impact of the knife blade.

6. An asparagus harvester as claimed in claim 5 further comprising f. a conveying system on the harvester rearward of the knife blade and its support bar in position to receive the severed stalks and convey same to a disposal destination.

7. An asparagus harvester as claimed in claim 1 in which the knife blade is approximately 20 gauge thickness with approximately 60° diamond point teeth in a pitch of the range ½ to 1½ inches.

8. An asparagus harvester as claimed in claim 5 in which the velocity of the air blast is in the range 3,500 to 5,000 feet per minute.